INVENTORS.
James L. Pettus &
Sten E. Bartelson
BY
ATTORNEY.

May 23, 1950
J. L. PETTUS ET AL
2,508,888
MULTIPLE UNIT OPTICAL SYSTEM FOR SOUND REPRODUCTION
Filed March 27, 1948
2 Sheets-Sheet 2
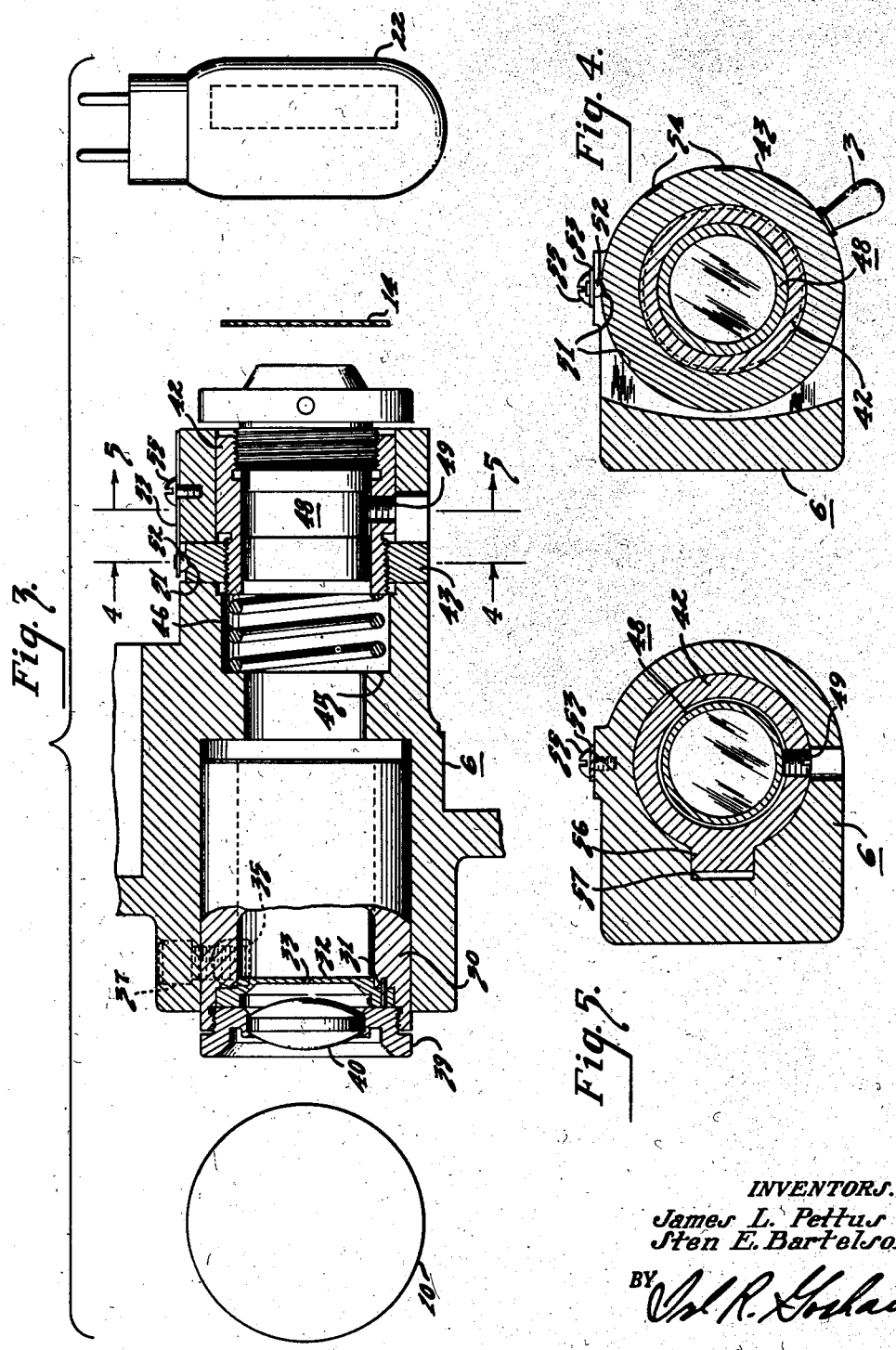
INVENTORS.
James L. Pettus &
Sten E. Bartelson
BY
ATTORNEY.

Patented May 23, 1950

2,508,888

UNITED STATES PATENT OFFICE 2,508,888

MULTIPLE UNIT OPTICAL SYSTEM FOR SOUND REPRODUCTION

James L. Pettus, North Hollywood, Calif., and Sten E. Bartelson, Ashland, N. J., assignors to Radio Corporation of America, a corporation of Delaware Application March 27, 1948, Serial No. 17,404

8 Claims. (Cl. 88—24)

1

This invention relates to sound recording and reproducing, and particularly to an optical system for sound reproducing apparatus.

In sound recording and reproduction, light sources, light defining apertures or slits, and light projecting optical units are employed, while in reproducing equipment, a photoelectric cell, upon which the light beam modulated by the sound record is impressed, is also used. The critical features or factors involved in sound reproduction are generally considered as a constant light source, a light slit which may be laterally adjusted and oriented to accurately position the light beam on the film sound record, and projection optics which focus the light slit on the surface of the film.

In the past, the condenser lens, slit assembly, and projection lenses were usually mounted as an integral unit, and adjustable as a unit between the light source and film. It was found, however, that this construction did not lend sufficient flexibility to permit accurate positioning and orientation of the slit and the accurate focusing of the slit on the sound record. It was also found that some sound films had to be threaded in the projector with the sound record toward the light source, while other films had to be threaded in the projector with the sound record on the side of the film away from the light source. It is well-known that to avoid distortion, the light slit should be focused on the surface of the film containing the sound record, and various arrangements have been provided for quickly shifting the focus from one side of the film to the other. One such type of system is disclosed and claimed in Triller copending U. S. application, Ser. No. 656,-215, filed March 22, 1946, now Patent No. 2,465,-945 dated March 29, 1949. The present invention not only provides a structure which permits of independent, fixed adjustments of the slit and focus of the projection unit between the light source and film, but also provides a rapid adjustment of focus when films of different types are reproduced.

The principal object of the invention, therefore, is to facilitate the projection of a focused light beam on a sound film.

Another object of the invention is to provide an improved optical unit for forming light into a beam and the focusing of the beam forming aperture upon the film.

A further object of the invention is to provide an improved optical unit between the source of a light beam and a film which permits the light beam forming element to be adjusted independently of the focusing optical unit, and, in addition, permits a rapid shift in focus of the beam forming aperture between two limiting positions.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 3 is an expanded view showing the optical unit in cross-section.

Fig. 4 is a cross-sectional view of the optical unit taken along the line 4—4 of Fig. 3, and Fig. 5 is a cross-sectional view of the optical unit taken along the line 5—5 of Fig. 3.

Figures 1, 2:
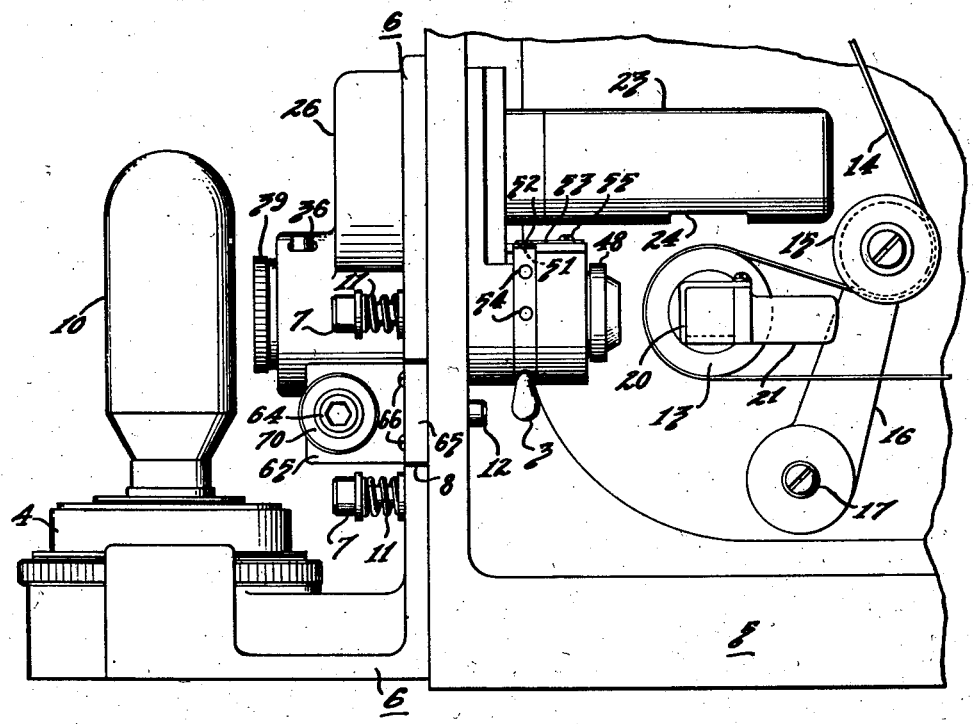
Fig. 1 is an elevational view of the portion of a sound film reproducer embodying the invention.
Fig. 2 is an end view of the reproducer, optical unit, and mounting therefor.

Referring now to the drawings, in which the same numerals identify like elements, a housing or casing 5 has mounted at one end thereof and extending through an opening therein, an L-shaped supporting bracket 6 attached by four spring pressed screws 7, on the horizontal portion of which is mounted a lamp 10 in a base 4 adapted to adjust the height of the lamp. The bracket has a rectangular notch or keyway 8 in the boss 9 into which a horizontal rectangular key extension from the casing 5 is inserted and on which the bracket is slidable. The key extension is attached by screws, one of which is shown at 12.

Mounted within the reproducing unit is a drum 13 over which a film 14 passes and overhangs, the film being tensioned by an idler roller 15 mounted on an arm 16 pivoted at 17. Mounted behind the edge of the film 14 and within the hollow drum 13 is a prism reflector 20 mounted on a bracket 21 for deflecting light from the optical unit to a photocell 22 positioned within a shield 23 having a window 24. The photocell is plugged into a base extending into a boss 26 of the bracket 6.

Referring now to the optical unit, particularly as shown in cross-section in Fig. 3, the bracket 6 has a cylindrical bore of different internal diameters, the left-hand portion of which contains a barrel 30 in which is pinned by pin 31 a slit plate 32 having a slit 33 therein. The barrel 30 has notches at the upper portion thereof with flat shoulders such as shown at 35 against which screws 36 and 37 abut, the screws being threaded in the bracket 6 and thus providing a rotating means for the barrel 30 within the bore of the bracket 6. In this manner, the slit 33 may be oriented or adjusted so as to be perpendicular to the direction of motion of the film 14.

Mounted in a holder 39 is a condenser lens 40, the holder 39 being externally threaded for attachment to the barrel 30. The barrel 30, carrying the slit 33 and the condenser lens 40, may be slightly adjusted along the optical axis of the unit, since the shoulder portions 35 of the notches are slightly larger in diameter than the screws 36 and 37.

Referring now to the projection lens unit for focusing the slit 33 on the film 14, this unit comprises a barrel or sleeve 42 having its left-hand end externally threaded, and on which threads is a ring 43. Between the end of the sleeve 42 and a shoulder 45 of the bore is a coil compression spring 46 to eliminate any back-lash in case of wear of the threads between the ring 43 and the sleeve 42. Threaded within the right-hand end of the sleeve 42 is an optical barrel unit 48 housing the objective lenses, and which may be axially adjusted to a limited extent by its threaded connection in the sleeve 42. A set screw 49 fixedly holds the barrel 48 in the sleeve 42 at any desired position. However, to focus the slit 33 accurately on one particular side of the film 14, the ring 43 is rotated, and, since the ring 43 is in an annular groove in the casing of the bore, it will remain stationary and the sleeve 42 will be moved axially. Spring 46 prevents backlash between the ring and the sides of the groove.

The ring 43 has two spaced notches 51 on its circumference, (see Fig. 4), into which the ball end 52 of a spring 53 held by a screw 55 is adapted to be positioned when the ring 43 is turned by a hand pin 3. Two indentations 54 facing the front of the recorder serve as markers indicating the position of the ring 43 at any particular time. Thus, when the ring has been adjusted to focus the slit image to one side of the film, it is only necessary to rotate the ring 43 from one notch 51 to the other to shift the focus to the other side of the film. The reverse action shifts the focus back again. The barrel or sleeve 42 is maintained in fixed rotational position by having a key extension 56 slidable in a groove or keyway 57 in the bracket 6.

To laterally or transversely position the entire optical unit together with the lamp 10 with respect to the film 14, an elongated opening 60 in a boss 61 of the mounting bracket 6 has a slot 62 into which is positioned a screw 64. Screw 64 is threaded in an angle bracket 65 attached by screws 66 to the casing 5, the screw portion having a shoulder 68 larger than the opening 62 and having an up-set end portion 69 also larger than the opening 62. A lock nut 70 is provided on the threaded portion of the screw 64. Thus, by rotation of the screw 64, the entire bracket 6 carrying the optical unit and the lamp 10 may be adjusted laterally or transversely of the film 14 to properly position the image of the light slit 33 on the sound track portion of the film. To permit this movement, the holes for the screws 7 are elongated horizontally, the pressure of the springs 11 holding the bracket tightly against the casing 5.

The above optical unit mounting, therefore, has several features which permit, first, the lateral or transverse positioning of the image of a light slit on a film, the proper orientation of the light slit with respect to the film motion along with an independent axial adjustment of the light slit and condenser lens with respect to the film and light source, an independent focusing of the light slit upon a surface of the film, and a rapid shift of focus from one side of the film to the other. These adjustments may be quickly accomplished, since all are easily accessible, the latter being made simply by throwing a lever to one of two predetermined positions. The system is thus quickly adjusted to an optimum reproducing condition which is required after cleaning or after a change of any element has been made, such as the lamp 10.

We claim:

1. An optical unit for a film drive mechanism comprising a film, a bracket, a lamp mounted on said bracket, a light collecting and light beam forming unit mounted on one portion of said bracket, a focusing unit mounted on said bracket in axial alignment with said light collecting and light beam forming unit, means for laterally shifting said bracket with respect to said film, means for axially shifting the light collecting and light beam forming unit between said lamp and said film, said means also providing a rotational adjustment of said light beam forming unit with respect to said film, and means for axially adjusting said focusing unit between said lamp and said film.

2. An optical unit in accordance with claim 1, in which said first mentioned means includes an extension on which said bracket is slidable, and a screw between said extension and said bracket for sliding said bracket along said extension.

3. An optical unit in accordance with claim 1, in which said second and third mentioned means include a cylindrical barrel mounted within said bracket, and a pair of adjusting screws having their ends bearing on said barrel on opposite sides of the axis of said barrel, said barrel being movable axially.

4. An optical unit in accordance with claim 1, in which said last mentioned means includes a barrel within said bracket, an objective lens unit within said barrel, and a rotatable ring threaded on said barrel and fixedly mounted against axial movement.

5. An optical unit for a sound film reproducer comprising means for holding a sound film in a fixed position a casing for said reproducer, an L-shaped bracket having a horizontal portion and a vertical portion mounted on said casing and extending through said casing, a lamp mounted on the horizontal portion of said bracket, said vertical portion of said bracket having a cylindrical barrel with a bore therein, an optical and light defining unit in one end of said bore, means for rotationally adjusting said light defining unit and permitting axial movement thereof, an independently adjustable objective optical unit within the other end of said bore, means for independently adjusting said objective unit to focus the image of a slit in said light defining unit on one surface of said film, and means for rapidly shifting said focus to the opposite surface of said film.

6. An optical unit in accordance with claim 5, in which mounting means are provided between said casing and said bracket for shifting said bracket transversely of said film.

7. An optical unit in accordance with claim 5, in which said independently adjustable means for said objective optical unit for focusing the image of said slit on one surface of said film includes a threaded objective holder and a sleeve slidable within said bore.

8. An optical unit in accordance with claim 7, in which said last mentioned means includes a ring positioned in a groove on said barrel and threaded on said sleeve, rotation of said ring through a predetermined angle shifting the focus of the image of said slit from one surface of said film to the other.

JAMES L. PETTUS.
STEN E. BARTELSON.

REFERENCES CITED

The following references are of record in the file of this patent:

UNITED STATES PATENTS

| Number | Name | Date |
|---|---|---|
| 1,989,754 | Kindelmann et al. | Feb. 5, 1935 |
| 2,005,068 | Batsel | June 18, 1935 |
| 2,123,871 | Weiss | July 19, 1938 |
| 2,131,280 | Haas | Sept. 27, 1938 |
| 2,196,583 | Collins | Apr. 9, 1940 |
| 2,244,754 | Zimmerman | June 10, 1941 |